United States Patent [19]

Kawabata et al.

[11] 4,303,531

[45] Dec. 1, 1981

[54] METHOD FOR ADSORBING AND RECOVERING PHENOLS

[75] Inventors: Nariyoshi Kawabata, Osaka; Sinichi Yasuda, Otsu

[73] Assignee: Koei Chemical Co., Ltd., Osaka, Japan

[21] Appl. No.: 97,674

[22] Filed: Nov. 27, 1979

[30] Foreign Application Priority Data

Nov. 28, 1978 [JP] Japan .............................. 53-147624
Oct. 22, 1979 [JP] Japan .............................. 54-136921

[51] Int. Cl.$^3$ .............................................. B01D 15/00
[52] U.S. Cl. ................................. 210/663; 210/673; 210/674; 210/679; 210/692; 210/909
[58] Field of Search .................. 210/27, 30 R, 32, 36, 210/37 R, 40, 663, 669, 673, 674, 679, 692, 909; 521/26, 32; 526/265

[56] References Cited

U.S. PATENT DOCUMENTS

| | | | |
|---|---|---|---|
| 2,254,745 | 9/1941 | Jannek | 210/40 |
| 2,366,008 | 12/1944 | D'Alelio | 210/36 |
| 2,801,223 | 7/1957 | Greer | 521/32 |
| 3,179,703 | 4/1965 | Rieman | 521/32 |
| 3,293,195 | 12/1966 | Greer | 210/37 R |

OTHER PUBLICATIONS

Anderson et al., "Phenol Sorption on Ion Exchange Resins", Ind & Eng. Chem., vol. 47, No. 1, (Jan. 1955), pp. 71-75.

*Primary Examiner*—Ivars C. Cintins
*Attorney, Agent, or Firm*—Stevens, Davis, Miller & Mosher

[57] ABSTRACT

The present invention relates to a: (a) material for adsorbing and recovering phenols which comprises as its main component a cross-linked polyvinylpyridine resin and (b) a method of recovering phenols using the above material.

14 Claims, No Drawings

METHOD FOR ADSORBING AND RECOVERING PHENOLS

The present invention relates to a material for adsorbing and recovering phenols which comprises as its main component a polymer obtained by copolymerizing at least one monovinylpyridine and a cross-linking agent.

Phenols are widely used and are useful as raw materials for phenol resins, synthesized dyes, pharmaceuticals and the like. However, since phenols are toxic materials, it is necessary to recover them from industrial waste water produced when preparing or handling phenols for the purpose of preventing environmental contaminations and saving resources.

There are many sources generating industrial waste water containing phenols, for example (a) waste coke oven gas liquor which is generated when removing or neutralizing ammonia contained in a gas liquor and obtained at the time of purifying the gas produced with coal tar, and (b) coke oven gas obtained in the production of coke by dry-distilling coal in the iron and steel industry, utility gas industry and other chemical industries. Generally, the waste water contains 1,000 to 5,000 ppm of phenols with cyanocompounds and thiocyano compounds and the chemical oxygen demand (COD) of the waste water reaches 5,000 to 10,000 ppm.

Another type of phenol containing the waste water, is that of the phenol resin manufacturing industry, generated in the course of production of phenol resins (phenol resin, alkyl-phenol resin such as cresol, xylenol, trimethyl phenol and so on), alkenylphenol resin, polyhydric phenol resin (such as resorcinol etc.,) polyphenol resin, modified phenol resin and the like). This type of waste water contains, 1 to 10 percent by weight of phenols in addition to formaldehyde, methanol etc. COD of such waste water reaches up to 100,000 ppm or more.

Since large amounts of phenols are contained in industrial waste waters such as waste coke oven gas liquor, phenol resin industry waste water and the like, severe regulations were established for the disposal of such waste waters to prevent environmental contamination. Accordingly, any cleaning or recovering treatment should be applied to such waste water before disposal of. Cleaning or recovering methods, such as activated sludge process, solvent extraction method, chemical treatment method, activated carbon treatment method and the like have been used. However those methods are unsatisfactory ones.

For instance, the activated sludge process necessitates pre-treatment for decreasing the concentration of phenols before treating them by this process for preventing possible death of the microorganisms being used due to high concentrations of the phenols in the waste water, and this process requires a wide space for constructing a plant therefor and furthermore this process needs a post-treatment of the sludge resulting therefrom.

On the one hand, the solvent extraction method and chemical treatment method have defects such as difficulty in complete removal or treatment of the phenols in the waste water as well as a need for secondary treatment of the treated waste water owing to the possible admixture of the extracting solvent or chemical treating agent in the treated water. Furthermore, this method needs a subsidiary countermeasure for preventing the atmospheric contamination due to the vaporization of the solvent used as well as a countermeasure against a leakage of the solvent used.

On the other hand, a method for recovering phenols by adsorption of phenols with a benzene type ion-exchange resin has been proposed. This method has no such defects as those of the prior art mentioned above, but is very low in adsorption ratio of the phenols and has a low adsorption selectivity so that it adsorbs also other co-existing organic substances or metallic ions together with phenols. Furthermore, this method has a defect in that elution of the adsorbed phenols is difficult. More specifically, the phenols adsorbed in this type of ion-exchange resin cannot easily be eluted even when using an aqueous alkaline solution as an eluting agent which is not satisfactory as a eluting agent. Moreover, even if the phenols were eluted in the alkaline solution, a chemical reaction takes place in the alkaline solution, which prevents its recycling as a eluting agent as well as re-use of the recovered phenols. Therefore, this method has not yet been commercially practices.

Under the circumstances, an excellent material for adsorbing and recovering phenols has been eagerly seeked which has a strong capacity for adsorbing phenols, and from which the phenols, once adsorbed can easily be eluted, recovered and re-used as they are.

The present inventors have made intensive studies for developing such materials for adsorbing and recovering phenols. As a result of such studies, the present inventors have now found out that a polymer obtained by copolymerizing one or more monovinyl pyridine monomers with one or more vinyl monomer having a number of ethylenically unsaturated groups in the molecule, can overcome the defects in the prior art and provide a material particularly suitable for the adsorption of phenols from an industrial waste water containing phenols such as waste coke oven gas liquor, phenolic resin manufacturing plant waste water and the like. This leads to the present invention.

The object of the present invention is to provide a material for adsorbing and recovering phenols which comprises as its main component a polymer compound obtained by copolymerizing at least one monovinyl pyridine monomer with a vinyl monomer the latter having a number of ethylenically unsaturated groups in the molecule and acting as a crosslinking agent.

Another object of the present invention is to provide a treating method for recovering phenols by using the above-mentioned material for adsorbtion and recovery of phenols.

It has already been known before the present invention that a copolymer compound of vinylpyridine having crosslinked structures can be used as an ionexchange resin, but it has been used almost solely for recovery of metals, and it has not yet been known as a material for adsorbing phenols.

In preparing the polymer of the present invention, a suspension polymerization is the most preferred method according to which at least one monovinyl-pyridine is copolymerized with a crosslinking agent and, if desired, together with a monovinyl monomer other than monovinyl pyridine in an aqueous medium in the presence of a conventional polymerization catalyst to obtain a spherical polymer. Additionally, methods of emulsion polymerization or block polymerization can also be used.

Monovinylpyridines which can be used as the raw materials of the present invention include the following: 2-vinylpyridine, 4-vinylpyridine, 5-ethyl-2-vinylpyridine, 2-methyl-5-vinylpyridine, 2-methyl-6-vinylpyridine, 2-(4-pyridyl)-allyl alcohol and the like. Among the monovinyl pyridines illustrated in the above, 4-vinylpyridine is the most preferred.

As to the crosslinking agent, a vinyl compound having a plurality of ethylenically unsaturated groups in the molecule is used; for example, an aromatic polyvinyl compound such as divinylbenzene, divinyltoluene, divinylnaphthalene, trivinylbenzene etc.; an aliphatic polyvinyl compound such as ethylene glycol diacrylate, ethylene glycol dimethacrylate, etc.; a nitrogen-containing polyvinyl heterocyclic compound such as divinylpyridine, divinylquinoline, divinylisoquinoline and the like.

The polyvinyl monomer is used alone or in a mixture of more than one of them. The amount of the polyvinyl monomer used as a crosslinking agent ranges between 0.5 and 50 percent by weight of the monovinyl pyridine monomer used.

Besides the two kinds of monovinyl monomers mentioned above, other monovinyl monomers may be used in the copolymerization of the present invention. For instance, the following monomers may be used alone or in combination of two or more thereof; for example, an aromatic monovinyl monomer such as styrene, vinyltoluene, ethylvinylbenzene, vinylnaphthalene, chlorostyrene etc.; an aliphatic monovinyl monomer such as methyl acrylate, methyl methacrylate, acrylonitrile, etc; a nitrogen-containing heterocyclic monomer such as vinyl isoquinoline, vinylquinoline and the like.

In carrying out the copolymerization, a catalyst is used and it may be suitably selected from the group conventionally used in polymerization of vinyl compounds. For example benzoyl peroxide, tert-butyl peroxyde, lauroyl peroxide, 2,2'-azobisisobutyronitrile etc. are preferably used in the copolymerization of the present invention. The amounts used of the catalyst range from 0.01 to 5% by weight of the monomer mixture. A suspension polymerization in water to obtain a spherical polymer is generally used in the present invention, but a method of emulsion polymerization or block polymerization can also be used.

The polymer compound of the present invention may have either a gel type or a porous type structure. For obtaining a polymer of porous type, a pore forming agent is added to the reaction system in addition to the monomer mentioned above. As to such pore-forming agent, monovinyl linear polymer disclosed in Japanese Patent Publication No. 40431/1971, a precipitant such as an alkanol having 4 to 10 carbon atoms or a higher alphatic hydrocarbon such as heptane or isooctane disclosed in Japanese Patent Publication No. 18791/1961 or 13792/1962 or a micelli-forming solubilizer such as sulfosuccinic acid, sodium bis-2-ethylhexylate or dodecyl ammonium acetate disclosed in Japanese Patent Publication No. 40315/1962 and the like may be used in the present invention.

The materials for adsorbing and recovering phenols of the present invention show a very high degree of adsorptivity for phenols, especially for phenol, cresol, xylenol etc., and have an excellent selectivity for adsorption of phenols which is not affected by the coexistence of organic substances, metallic ions and the like.

The materials of the present invention a preferably used for treatment of an aqueous phenol-containing liquor, but may be used to treat a gaseous medium containing phenols. In the case that the treated liquor is an aqueous solution containing phenols, the liquor may contain inorganic salts, methanol, organic acid, some amounts of hydrochloric acid or sulfuric acid and the like beside the phenols. The phenols treated with the material of the present invention are their compounds having in the molecular formula a constituent expressed by the formula:

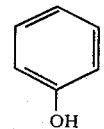

Such phenols are illustrated as phenol, cresol, xylenol, bisphenol A and the like.

The material for adsorbing and recovering phenols of the present invention facilitates a high degree of adsorption of phenols as shown in the Examples and moreover carries out easily the elution of absorbed phenols by using an organic solvent for example an aliphatic alcohol such as methanol, ethanol, propanol, isopropanol etc.; an aliphatic ketone such as acetone, methyl ethylketone; or an organic acid ester such as methyl acetate, ethyl acetate etc. The efficient liquor can be used as it is or after recovering phenols therefrom by distillation of the organic solvent.

Furthermore, in case that the use of an organic solvent is not preferred, then steam and/or hot water can be used as an eluting agent for eluting phenols from the material. It should be noted that, generally, a benzene-type ion-exchange resin is decayed easily when it is heated around a temperature in a range of 60° to 80° C. On the other hand the material of the present invention displays considerable heat-resistance even when heated up to about 200° C. Thus the heat resistance of the material of the present invention is one of the most important features.

It constitutes one feature of the present invention that the phenols adsorbed can be so easily eluted by use of organic solvents. Furthermore, an aqueous solution of an inorganic acid such as hydrochloric acid, sulfuric acid etc., or an inorganic base such as sodium hydroxide, potassium hydroxide etc. can also be, used as the eluting agent for phenols.

The material for adsorbing and recovering phenols of the present invention composed of a polymer can be used as it is, as well as in an added form with an inorganic acid such as hydrochloric acid, sulfuric acid, nitric acid etc. Furthermore, the material of the present invention can be used for the treatment of industrial waste water as it is or in an acid added form. It is also used in a mixture with a suitable carrier for instance such as activated charcoal, silica gel, activated alumina, zeolite, graphite and the like, and then shaped in a suitable form. The term "a material for adsorbing and recovering phenols" used herein involves all of the material for adsorbing and recovering containing as its main component the polymer disclosed thereinbefore.

The adsorbing and recovering material of the present invention can be used in combination with suitable ion exchange resins. The combined use can make is possible to remove organic substances other than phenols together with impurity ions in one treatment.

In practicing the removal of phenols from waste water in accordance with the present invention, treatment of the waste water is easily carried out by only contacting the adsorbing material of the present invention with the waste water stream. Therefore, treatment of the waste water can be carried out in any one of the following methods, such as merry-go-round type treating method, moving-bed type treating method and fluidized-bed type treating method. The contact time of the waste water stream with the adsorbing and recovering material may vary from several seconds to several minutes. There is no lower limitation on the contact temperature and the treatment operation can be carried out well at room temperature.

Furthermore, if the method of the present invention is practiced in combination with the activated sludge process, activated carbon method and the like, the obtained treated water can be reused as an industrial water.

The present invention contains in its scope a method for removing phenols from industrial waste water which comprises adsorbing phenols on to the material of the present invention to remove them from waste water and also a method for recovering phenols by eluting the adsorbed phenols from said material to recover phenols.

As mentioned above, the waste water treating method of the present invention can be applied to any kind of industrial waste water containing phenols, and is especially effective for the treatment of waste water of phenolic resin industry and coke oven gas liquor.

The present invention is explained in the following way by Examples relating to the material for adsorbing and recovering phenols of the present invention and the application thereof to the phenol adsorbing and recovering treatment of waste water originating from the phenolic resin industry and coke oven gas liquor, but the present invention can also be applied to any kind of waste water containing phenols originating from other sources.

EXAMPLE 1

200 Grams of commercially available 4-vinylpyridine which was purified by simple distillation under reduced pressure and 40 grams of commercially available divinylbenzene were suspended in 800 grams of 20% aqueous solution of sodium chloride (to which hydroxyethylcellulose was added as a dispersing agent). Benzoyl peroxide was added to the suspension as an initiator and the reaction was carried out for 5 hours at 80° C. After the reaction the obtained resin was washed with methanol and then with water to obtain 330 grams of gel type resin.

For the purpose of comparing the absorption and desorption capacities to phenol of the 4-vinylpyridine-divinylbenzene resin thus obtained resin with those of the commercially available resins such as Amberlite IRA-400, Amberlite XAD-4, Amberlite XAD-2 and Amberlite IR-45 (each of them are trademarks of ion-exchange resins manufactured and sold by Rohm & Haas Co., Ltd.), 300 ml of each resin was packed respectively into ion-exchange resin towers having an inner diameter of 2 cm. Aqueous solutions containing phenol in a concentration of 3000 ppm were respectively passed through each of the packed towers at a rate of 900 ml/hour to a break through point of 1 ppm. The adsorbed amounts of phenol on each of the ion-exchange resins are shown in Table 1. Then, methanol was passed through each tower at a range of 600 ml/hour for desorption and the elution ratio of phenol were shown in Table 1.

TABLE 1

| Ion-Exchange resin | Phenol Adsorbed amount | Elution ratio[4] |
|---|---|---|
| 4-Vinylpyridine-divinyl-benzene resin | 37.1 g | 85% |
| Amberlite IRA-400[1] | 48.1 g | 20% |
| Amberlite IR-45[2] | 14.3 g | 30% |
| Amberlite XAD-2[3] | 6.6 g | 75% |
| Amberlite XAD-4[3] | 11.1 g | 85% |

(Note)
[1] Gel type, the strongest basic anion exchange resin
[2] Weak basin anion exchange resin
[3] Porous stryrene-divinylbenzene copolymer
[4] Elution ratio = $\frac{\text{eluted amount of phenols}}{\text{adsorbed amount of phenols}} \times 100\ (\%)$

EXAMPLE 2

200 Grams of commercially available 4-vinylpyridine which was purified by simple distillation under reduced pressure, 130 g of commercially available divinylbenzene and 60 g of isooctane were suspended into 1000 g of 20% sodium chloride aqueous solution (to which was added hydroxyethylcellulose as a dispersing agent). Benzoyl peroxide initiator was added to the suspension and polymerization was carried out for 5 hours at 80° C. After reaction was completed, the obtained resin was washed well with methanol and then with water to obtain 450 g of porous resin.

300 Milliliters of the resins thus obtained were packed to an ion-exchange resin tower having an inner diameter of 2 cm. An aqueous phenol solution having a concentration of 10,000 ppm was passed through the tower at a passing rate of 900 ml/hour. The amounts of phenol adsorbed until a break through point of 1 ppm was reached are shown in Table 2. Acetone was then passed through the tower at a passing rate of 600 ml/hour for 1.7 hours The elution ratios of phenol are shown in Table 2. For comparison, the same resins used in Example 1 were used and the same tests were carried out. The results are shown in Table 2.

TABLE 2

| Ion-exchange resin | Phenol Adsorbed amount | Elution ratio |
|---|---|---|
| 4-Vinylpyridine-divinyl-benzene resin | 29.7 g | 98% |
| Amberlite IRA-400 | 38.5 g | 32% |
| Amberlite IR-45 | 11.4 g | 38% |
| Amberlite XAD-2 | 5.3 g | 92% |
| Amberlite XAD-4 | 8.9 g | 96% |

EXAMPLE 3

160 Grams of commercially available 4-vinylpyridine which was purified by simple distillation under reduced pressure, 40 g of commercially available 2-vinyl-5-ethylpyridine which was purified by distillation under reduced pressure with 135 g of divinylbenzene and 60 g of 2-ethylhexyladipate were suspended into 1,000 g of sodium chloride aqueous solution (to which hydroxyethylcellulose was added as a dispersing agent). Benzoyl peroxide was added to the suspension as an initiator and polymerization was carried out for 5 hours at 80° C. After the completion of reaction, the resin was washed well with methanol and then with water to obtain 450 g of resin. 300 Milliliters of the resins thus obtained were packed into an ion-exchange resin tower having an inner diameter of 2 cm. An aqueous solution containing cresol at a concentration of 3,000 ppm was passed through the tower at a passing rate of 900 ml/hour. The amounts of cresol adsorbed until a break through point of 1 ppm was reached are shown in Table 3. Then isopropanol was passed through the tower for 1 hour at a passing rate of 600 ml/hour. The elution ratios of cresol are shown in Table 3. The same resins used in Example 1 as controls were also used here. The results obtained are also shown in Table 3.

TABLE 3

| | Cresol | |
|---|---|---|
| Ion-exchange resin | Adsorbed amount | Elution ratio |
| 4-Vinylpyridine-divinyl-benzene resin | 42.7 g | 82% |
| Amberlite IRA-400 | 55.3 g | 18% |
| Amberlite IR-45 | 16.4 g | 25% |
| Amberlite XAD-2 | 7.6 g | 71% |
| Amberlite XAD-4 | 12.8 g | 80% |

EXAMPLE 4

300 Milliliters of porous 4-vinylpyridinedivinylbenzene resin obtained in Example 2 was packed into an ion-exchange resin tower having an inner diameter of 2 cm. An aqueous solution of xylenol having a concentration of 3,000 ppm was passed through the tower at a passing rate of 900 ml/hour. The amount of xylenol adsorbed until a break through point of 1 ppm was reached is shown in Table 4. Then, methyl acetate was passed through the tower at a passing rate of 600 ml/hour for 1 hour, and the elution ratio obtained is shown is Table 4.

The same comparison tests were carried out by using the same resins as used in Example 1. The result obtained are also shown in Table 4.

TABLE 4

| | Xylenol | |
|---|---|---|
| Ion-exchange resin | Adsorbed amount | Elution ratio |
| 4-Vinylpyridine-divinyl-benzene resin | 48.2 g | 88% |
| Amberlite IRA-400 | 62.5 g | 18% |
| Amberlite IR-45 | 18.5 g | 31% |
| Amberlite XAD-2 | 8.6 g | 89% |
| Amberlite XDA-4 | 14.4 g | 92% |

EXAMPLE 5

800 Grams of commercially available 4-vinylpyridine which was purified by simple distillation under reduced pressure and 80 g of commercial available divinylbenzene were suspended into 600 ml of aqueous sodium formate solution having a concentration of 15% (to which hydroxyethylcellulose was added as a dispersing agent). 8 Grams of benzoyl peroxide was added to the suspension and the polymerization was carried out for 5 hours at 80° C. After the reaction was completed, the obtained resin was washed well to obtain about 1,200 ml of the resin in bead form.

1,000 Milliliters of the obtained resin were packed into a column having a diameter of 4 cm. Waste water originating from a Novolak-type type phenol resin manufacturing plant, containing 42,400 ppm of phenols and having a COD of 125,000 ppm was passed to the tower at a passing rate of 3,000 ml/hour for 1.7 hours. The waste water thus treated contained phenols at a concentration of 5 ppm, adsorbed the adsorbed phenols adsorbed on to the resin amounted to 220 g, and the COD of the treated waste water decreased to 49,490 ppm.

After the supply of waste water to the tower was stopped, methanol was passed through the tower at a passing rate of 2000 ml/hour for 2 hours. Methanol was removed by distillation and then 216 g of phenols were recovered from the effluent. The elution ratio of phenols with methanol was 98%.

EXAMPLE 6

Admixture of 1,460 grams of commercially available 2-methyl-5-vinylpyridine, 870 g of commercially available divinylbenzene, 380 grams of isooctane and 33 g of benzyl peroxide was suspended into an aqueous solution containing 1,000 g of sodium chloride, 19 g of sodium nitrite and 28 g of hydroxyethylcellulose in 5,100 g of water. The suspension was gradually heated to 80° C. during 1 hour, and was kept at 80° C. for 7 hours. After cooling, the reaction mixture was filtered to obtain granular resins. The obtained resins were washed with methanol and then with water to obtain 5,500 ml of white coloured opaque porous cross-linked polymer.

1,000 Milliliters of the obtained cross-linked polymer were packed into a glass tube having an inner diameter of 3 cm to obtained a packed tower.

Waste water originating from a cresol resin manufacturing plant, and containing 14,000 ppm of cresol, was passed through the tower at a passing rate of 3,000 ml/hour for 2.3 hours.

The waste water treated contained a cresol concentration of 5 ppm and the amounts of cresol adsorbed on to the resin amounted to 98 grams.

After the supply of waste water to the tower was stopped, acetone was passed through the tower at a passing rate of 2000 ml/hour for 2 hours. Acetone was removed by distillation and then 98 g of cresol was recovered from the effluent. The elution ratio of cresol with acetone was 100%.

EXAMPLE 7

300 Grams of commercially available 2-vinylpyridine, 100 g of commercially available 4-vinylpyridine, 100 g of commercially available divinylbenzene were suspended into 3,000 ml of 20% sodium chloride aqueous solution (to which 12 g of hydroxyethylcellulose were added as a dispersing agent). 8 Grams of benzoyl peroxide were added to the suspension and a reaction was carried out at 80° C. for 8 hours. After the reaction was completed, the obtained granular cross-linked polymers were washed with methanol and then with water to obtain 800 ml of the polymer in bead form.

600 Millimeters of the obtained cross-linked polymers were packed into a glass tube having an inner diameter of 3 cm to obtain a packed tower.

Waste water originating from a resorcinol resin manufacturing plant containing 40,000 ppm of resorcinol was passed through the packed tower at a passing rate of 2,400 ml/hour for 1 hour. The waste water thus treated contained 5 ppm of resorcinol and the amount of the resorcinol adsorbed on the resin was 98 grams.

After the passing of the waste water to the tower was stopped, ethyl acetate was passed through the tower at a passing rate of 1200 ml/hour for 2 hours. From the effluent ethyl acetate was removed by distillation and then 89 g of resorcinol were recovered. The elution ratio of resorcinol with ethyl acetate was 91%.

EXAMPLE 8

200 Grams of 5-ethyl-2-vinylpyridine, 136 g of commercially available divinylbenzene, 59 g of isooctane, 2 g of benzoyl peroxide and 3.4 g of lauroyl peroxide was suspended into an aqueous solution containing 234 g of sodium chloride, 2.9 g of sodium nitrite and 4.25 g of hydroxyethyl-cellulose in 800 g of water, to obtain a suspension. The suspension was gradually heated and then was reacted at 80° C. for 8 hours. After the reaction was completed, the obtained resins were washed with methanol and then with water to obtain 720 ml of white coloured opaque crosslinked polymers. The obtained polymers were immersed in 1,000 ml of 20% sulfuric acid aqueous solution for 2 hours to obtain sulfuric acid-salt of polymer.

600 Milliliters of the sulfuric acid-salt of polymer was packed into a glass tube having an inner diameter of 3 cm to obtain a packed tower. The same waste water as used in Example 1 was passed through the tower at a passing rate of 1,000 ml/hour for 1.9 hours. The waste water thus treated contained phenols at a concentration of 5 ppm. The amount of phenol adsorbed onto the polymer was 132 g.

Then the supply of waste water to the tower was stopped and isopropanol was passed through the tower at a rate of 1200 ml/hour. From the effluent isopropanol was removed by distillation and 69 g of phenols were recovered. The elution ratio of phenols with isopropanol was 89%.

EXAMPLE 9

500 Milliliters of the crosslinked polymer obtained in Example 5 were packed in each of two glass tubes having an inner diameter of 3 cm,. The two glass tubes were connected in series to make up a packed tower. Waste water originating from a resol type phenolic resin manufacturing plant and containing 42,000 ppm of phenol was adjusted to pH B 6.2 and then passed through the towers at a rate of 1,500 ml/hour for 4.5 hours. The waste water thus treated contained phenol at a concentration of 5 ppm. The amount of phenols adsorbed to the first column was 250 L g.

After the supply of the waste water to the tower was stopped, methanol was passed through only the first column at a rate of 1,000 ml/hour for 2 hours. Methanol was removed by distillation from the effluent and then 247 g of phenol was recovered. The elution ratio of phenol with methanol was 99%.

EXAMPLE 10

1,000 Milliliters of the porous crosslinked polymers obtained in Example 6 were immersed into 1,000 ml of 30% hydrogen chloride solution to prepare hydrochloric acid-added-polymer. 1,000 Milliliters of the polymer were added to 1,000 ml of a waste water originated from a Novolak type phenol resin manufacturing plant containing 30,000 ppm of phenol and agitated for 3 hours. The phenol concentration in the waste water thus treated was descreased to 450 ppm.

The polymer adsorbed with phenol was added to 1,000 ml of 3 N-NaOH aqueous solution and was agitated for 2 hours. The phenol concentration of this solution was 28,960 ppm. The elution ratio was 95%.

EXAMPLE 11

200 Milliliters of the porous crosslinked polymer obtained in Example 7 were added to 400 ml of a waste water originating from a phenol resin manufacturing plant containing 3,000 ppm of allyl phenol and agitated for 3 hours. Allyl phenol concentration in the waste water was decreased to 20 ppm. The polymer adsorbed with allyl phenol was added to 200 ml of 3 N-$H_2SO_4$ aqueous solution and was agitated for 2 hours. Allyl phenol concentration of this solution was reduced to 5,423 ppm. The elution ratio obtained was 91%.

EXAMPLE 12

1,000 Milliliters of the crosslinked polymer beads obtained in Example 5 were packed into a column 4 cm in diameter. Waste water from a coke oven gas liquor (COD 3,500 ppm) containing 1,380 ppm of phenols was passed through the column at a passing rate of 3,000 ml/hour for 9.2 hours. The phenols concentration in the waste water thus treated was decreased to 5 ppm, the amount of phenols adsorbed on to the cross-linked polymer was 38 g and COD of the waste water was decreased to 210 ppm.

The supply of the waste water to the tower was stopped and then methanol was passed through the tower at a rate of 2000 ml/hour. Methanol was removed by distillation from the effluent and 37 g of phenols was recovered. The elution ratio of phenol with methanol was 98%.

EXAMPLE 13

1,000 Milliliters of the cross-linked polymer obtained in Example 6 were packed in a glass tube to obtain a packed tower. The same waste coke oven gas liquor as used in Example 12 was passed through the tower in a manner similar to that of Example 12. The phenol concentration of the waste water thus treated was decreased to 5 ppm, the amount of phenols adsorbed on the polymer was 41 g, and COD of the waste water was decreased to 195 ppm.

After the supply of the waste water to the tower was stopped, acetone was passed through the tower at a passing rate of 2000 ml/hour for 2 hours. Acetone was removed by distillation from the obtained effluent and 41 g of phenols were recovered. The elution ratio of phenols with acetone was 100%.

The treated waste water containing 5 ppm of phenols was passed through a column packed with 100 ml of Duolite A-1010 (a trademark of an ion-exchange resin manufactured and sold by Diamond Shamrock Co., U.S.A.) at a passing rate of 3000 ml/hour for 1 hour. By this treatment the concentration of ammonium thiocyanate in the waste water was decreased from 570 ppm to 5 ppm and COD thereof was decreased to 18 ppm.

EXAMPLE 14

600 Milliliters of the crosslinked polymer obtained in Example 7 were packed into a glass tube having an inner diameter of 3 cm to obtain a column. Waste coke oven gas liquor containing 2,430 ppm of phenols and having 7,100 ppm of COD was passed through the column at a rate of 2,400 ml/hour for 3.6 hours by a manner similar to Example 12. The phenols concentration in the waste water thus treated was decreased to 5 ppm, the amounts of phenols adsorbed on the polymer was 21 g and COD of the waste water was decreased to 390 ppm.

After the supply of the waste water to the column was stopped, ethyl acetate was passed through the tower at a rate of 1200 ml/hour for 2 hours. Ethyl acetate was removed by distillation and 19 g of phenols were recovered from the effluent. Elution ratio of phenols with ethyl acetate was 91%.

EXAMPLE 15

600 Milliliters of sulfuric acid salt type cross-linked polymer obtained in Example 8 were packed into a glass tube having an inner diameter of 3 cm to obtain a column. The same waste coke oven gas liquor as treated in Example 12 was passed through the column at a rate of 1,000 ml/hour for 7.5 hours. The phenols concentration in the waste liquor was decreased to 5 ppm, the amount of the phenols adsorbed on the column was 18 g and COD of the waste water was decreased to 320 ppm.

After the supply of the waste water to the column was stopped, isopropanol was passed through the column at a rate of 1200 ml/hour for 2 hours. Isopropanol were removed by distillation and 18 g of phenols was recovered from the effluent. The elution ratio of phenols with isopropanol was 100%.

EXAMPLE 16

500 Milliliters of the cross-linked polymer obtained in Example 5 were packed into two glass tubes, each having an inner diameter of 3 cm, in an amount of 500 ml each and. Then the two glass tubes were connected in a series to obtain a column. A waste coke oven gas liquor containing 1,380 ppm of phenols and having a COD of 3,500 ppm was passed through the column at a rate of 1,500 ml/hour for 14 hours. The phenols concentration in the waste water was decreased onto 5 ppm and 26 g of phenols were adsorbed to the polymer in the column.

After the supply of the waste liquor to the column was stopped, methanol was passed only through the first column at a passing rate of 1,000 ml/hour for 2 hours. Methanol was removed by distillation and 26 g of phenols were recovered from the effluent. The elution ratio of phenols with methanol was 100%.

EXAMPLE 17

500 Milliliters of porous cross-linked polymer obtained in Example 6 were immersed in 700 ml of 30% hydrogen chloride aqueous solution for 3 hours to obtain a hydrogen chloride salt type polymer. 200 Milliliters of the obtained polymer were added to 1,000 ml of a waste coke oven gas liquor containing 1,380 ppm of phenols and agitated for 3 hours. The concentration of phenols in the waste water decreased to 84 ppm by this treatment.

EXAMPLE 18

1,000 Milliliters of the cross-linked polymer obtained in Example 1 were packed into a glass tube having an inner diameter of 3 cm. As in Example 12, waste water from a coke oven gas liquor was passed through the column for 10 hours. The concentration of phenols in the treated waste water was 5 ppm. The amount of phenols adsorbed on the cross-linked polymer was 41 g and COD of the treated waste water was 195 ppm.

After the supply of the waste water was stopped, steam at 120° C. was passed through the polymer and the steam distilled from the polymer was condensed by cooling. The amount of condensed liquor thus obtained was 500 ml, and the concentration of phenols in the condensed liquor was 81,000 ppm. The elution ratio of the phenols was 98.8%.

EXAMPLE 19

1,000 Milliliters of the cross-linked polymer obtained in Example 1 were packed into a glass tube having an inner diameter of 3 cm. As in Example 12, waste water from coke oven gas liquor was passed through the column for 10 hours. The concentration of phenols in the treated waste water was 5 ppm. The amount of phenols adsorbed on the cross-linked polymer was 41 g and COD of the treated waste water was 195 ppm. After the supply of waste water was stopped, hot water of 80°–90° C. was passed through at the rate of 200 ml/hour for 2.5 hours. The concentration of the phenols in the elutant liquor was 74,800 ppm and the elution ratio of the phenols was 91.2%.

What we claim is:

1. A process for adsorbing and recovering phenols from an aqueous solution thereof, which process comprises:
    (a) contacting said solution with a material having as its main component a tertiary-amine-type, anion-exchange resin copolymer of (i) at least one monovinyl pyridine monomer and (ii) at least one vinyl comonomer, said comonomer having a number of ethylenically unsaturated groups, and acting as a crosslinking agent, thereby causing adsorption of phenols onto said material at a high rate, and;
    (b) subsequently eluting said material with an eluting agent from which said phenols can be separated by distillation, thereby substantially recovering said phenols, and regenerating said resin.

2. A process according to claim 1, wherein said aqueous solution is an industrial waste water containing phenols.

3. A process according to claim 2, wherein said industrial waste water is a waste coke oven gas liquor obtained by removing or neutralizing ammonia in a coke oven gas liquor, or a waste water originating from a phenolic resin manufacturing plant.

4. A process according to claim 1, wherein said eluting agent is at least one material selected from the group consisting of an aliphatic ketone, an aliphatic alcohol and an organic acid ester.

5. A process according to claim 1, wherein said eluting agent is at least one material selected from the group consisting of steam and hot water.

6. A process according to claim 1, wherein the process is carried out in combination with at least one method selected from the group consisting of an activated sludge process, an activated carbon treatment method, a solvent extraction treatment method, and an ion-exchange resin treatment method.

7. A process according to claim 1, wherein said monovinyl pyridine monomer is selected from the group consisting of 2-vinylpyridine, 4-vinylpyridine, 5-ethyl-2-vinylpyridine, 2-methyl-5-vinylpyridine, 2-methyl-6-vinylpyridine and 2-(4-pyridyl) allyl alcohol.

8. A process according to claim 1, wherein said vinyl comonomer is selected from the group consisting of divinylbenzene, divinyltoluene, divinylnaphthalene, ethyleneglycol diacrylate, ethyleneglycol dimethacrylate, divinyl pyridine, divinylquinoline and divinylisoquinoline.

9. A process according to claim 1, wherein said polymer has a gel type structure.

10. A process according to claim 1, wherein said polymer has a porous structure.

11. A process according to claim 1, wherein said polymer is a copolymer of 4-vinylpyridine and divinylbenzene.

12. A process according to claim 1, wherein said polymer is used in a mixture with a carrier.

13. A process according to claim 1, wherein said copolymer includes as constituents: (i) at least one first monovinyl monomer comprising a monovinyl pyridine, (ii) at least one second monovinyl monomer, other than a monovinyl pyridine, and (iii) a vinyl copolymer having a number of ethylenically unsaturated groups and acting as a crosslinking agent between said first and said second monovinyl monomers.

14. A process according to claim 13 wherein said additional monovinyl monomer is selected from the group consisting of styrene, vinyltoluene, ethylvinylbenzene, vinylnaphthalene, fluorostyrene, methyl acrylate, methyl methacrylate, acrylonitrile and vinylisoquinoline.

* * * * *

REEXAMINATION CERTIFICATE (912th)

United States Patent [19]
Kawabata et al.

[11] B1 4,303,531

[45] Certificate Issued  Aug. 23, 1988

[54] METHOD FOR ADSORBING AND RECOVERING PHENOLS

[75] Inventors: Nariyoshi Kawabata, Osaka; Sinichi Yasuda, Otsu, both of Japan

[73] Assignee: Koei Chemical Co., Ltd., Osaka, Japan

Reexamination Request:
No. 90/001,146, Dec. 24, 1986

Reexamination Certificate for:
Patent No.: 4,303,531
Issued: Dec. 1, 1981
Appl. No.: 97,674
Filed: Nov. 27, 1979

[30] Foreign Application Priority Data

Nov. 28, 1978 [JP] Japan ................ 53-147624
Oct. 22, 1979 [JP] Japan ................ 54-136921

[51] Int. Cl.$^4$ ................................ B01D 15/00
[52] U.S. Cl. ................................ 210/663; 210/673; 210/674; 210/679; 210/692; 210/909

[56] References Cited

U.S. PATENT DOCUMENTS

3,979,287  9/1976  Vulliez-Sermet et al. ...... 75/101 BE

OTHER PUBLICATIONS

1 Heterocyclic Compounds, 412 (1950).
Simpson, "The Separation of Organic Chemicals from Water", (Rohm & Haas) (1976), presented on Apr. 13, 1972).
Kunin, "Amber-Hi-Lites, Porous Polymers as Adsorbents-A review of Current Practice" (Rohm & Haas).
Kunin, "Amber-Hi-Lites, Applications of Ion Exchange, V. Pollution Abatement and Control (Continued)", (Rohm & Haas) (1971).
Kunin, Amber-Hi-Lites, Applications of Ion Exchange, VI. Pollution Abatement and Control (Continued)", (Rohm & Haas).
Technical Bulletin, Ion Exchange Department-Amberlite XAD-2", (Rohm & Haas) (1967).
"Summary Bulletin Amberlite Polymeric Adsorbents", (Rohm & Haas) (1970).
Kawabata et al., "Removal and Recovery of Organic Pollutants from Aquatic Environment. 1. Vinylpyridine-divinylbenzene Copolymer as a Polymeric Adsorbant for Removal and Recovery of Phenol from Aqueous Solution," Environmental Science Technology, 13, No. 11, 1396-1402 (1979).
Frechet et al., "Polymer Catalyzed Reactions: The Remarkable Self-Catalyzed Solublization of Cross--Linked 4-vinylpyridine-ethylenedimethacrylate," Reactive Polymers, 3, 151-158 (1985).
"Dowex: Ion Exchange," The Dow Chemical Company (1964).
"Plant Uses Prove Phenol Recovery with Resins," Hydrocarbon Processing, pp. 269-273, Nov. 1978 (author: Chester R. Fox, Rohm & Haas Co.).
"Removing Toxic Organics from Waste Water," C. R. Fox, CEP, Aug. 1979, pp. 70-77.
"Remove and Recover Phenol," C. R. Fox, Hydrocarbon Processing, Jul. 1975, pp. 109-111.
Davankov et al., "Adsorption Capacity of Polymeric Pyridine Derivatives and Formation of Complexes with Phenols," Journal of Applied Chemistry of the USSR, 35:1091-1093 (1962).
Davankov et al., "Synthesis and Studies on the Copolymers 2-methyl-5-vinylpyridine with Mono-, Di-, and Triethylene Glycol Dimethacrylates," translated from Izvestiya Vysshikh Uchebnykh Zavedenii, Khimiya Khimicheskaya Tekhnologiya 6(2):294-298(1963).
Davankov, "Synthesis of Complexing-Forming Selective Ion-Exchange Materials," translated from Tr. Mosk. Khim. Tekhnol. Inst., No. 64, 118-126 (1970)(Russ.), and Chemical Abstracts, 75, No. 77568 (1971), translated from Ref. Zh., Khim., Abstr. No. 17S 816 (1970).
Tsuchida et al., "Adsorption of Phenols on Polymers and Aqueous Solution," European Polymer Journal, 13, pp. 269-272 (1977).
Freeman et al., "Chromatographic and Analytical Properties with a Pyridine Type Functional Group," Analytical Chemistry, 45 No. 4, 768-774 (1973).

*Primary Examiner*—Ivars C. Cintin

[57] ABSTRACT

The present invention relates to a: (a) material for adsorbing and recovering phenols which comprises as its main component a cross-linked polyvinylpyridine resin and (b) a method of recovering phenols using the above material.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *